(12) United States Patent
Ahn et al.

(10) Patent No.: US 11,012,207 B2
(45) Date of Patent: May 18, 2021

(54) METHOD AND DEVICE FOR TRANSMITTING TRACKING REFERENCE SIGNAL

(71) Applicant: LG ELECTRONICS INC., Seoul (KR)

(72) Inventors: Joonkui Ahn, Seoul (KR); Seonwook Kim, Seoul (KR); Changhwan Park, Seoul (KR); Sukhyon Yoon, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/273,820

(22) Filed: Feb. 12, 2019

(65) Prior Publication Data

US 2019/0254069 A1 Aug. 15, 2019

Related U.S. Application Data

(60) Provisional application No. 62/629,651, filed on Feb. 12, 2018.

(51) Int. Cl.
| | |
|---|---|
| *H04L 5/00* | (2006.01) |
| *H04W 74/08* | (2009.01) |
| *H04W 72/04* | (2009.01) |
| *H04W 16/14* | (2009.01) |

(52) U.S. Cl.
CPC ....... *H04L 5/0048* (2013.01); *H04W 72/0446* (2013.01); *H04W 74/0808* (2013.01); *H04L 5/0007* (2013.01); *H04W 16/14* (2013.01)

(58) Field of Classification Search
CPC .......... H04W 72/0446; H04W 74/0808; H04L 5/0048
See application file for complete search history.

(56) References Cited

U.S. PATENT DOCUMENTS

| | | | | |
|---|---|---|---|---|
| 2007/0271471 A1* | 11/2007 | Merzlikine | ......... | G06F 12/1408 713/193 |
| 2015/0016339 A1* | 1/2015 | You | ...................... | H04J 11/0073 370/328 |
| 2015/0030037 A1* | 1/2015 | Ahn | .................. | H04W 56/0005 370/503 |
| 2015/0289208 A1* | 10/2015 | Liu | ....................... | H04L 1/1887 370/252 |
| 2016/0135179 A1* | 5/2016 | Yin | ..................... | H04J 11/0069 370/329 |
| 2018/0323918 A1* | 11/2018 | Chuang | ............... | H04L 27/2657 |

* cited by examiner

*Primary Examiner* — Kevin C. Harper
(74) *Attorney, Agent, or Firm* — Dentons US LLP

(57) ABSTRACT

A method for transmitting a tracking reference signal (TRS) in an unlicensed band and a device using the method are provided. The device performs listen before talk (LBT) in the unlicensed band and transmits the TRS in a TRS resource set according to a result of the LBT.

8 Claims, 6 Drawing Sheets

METHOD AND DEVICE FOR TRANSMITTING TRACKING REFERENCE SIGNAL

CROSS-REFERENCE TO RELATED APPLICATIONS

Pursuant to 35 U.S.C. § 119 (e), this application claims the benefit of U.S. Provisional Application No. 62/629,651, filed on Feb. 12, 2018, the contents of which are all hereby incorporated by reference herein in their entirety.

BACKGROUND OF THE INVENTION

Field of the Invention

The present invention relates to wireless communication, and more particularly, to a method and device for transmitting a tracking reference signal (TRS) in a wireless communication system.

Related Art

A 3rd Generation Partnership Project (3GPP) agreed on the overall schedule and concept of 5G standardization at the workshop held in September 2015. An Enhanced Mobile Broadband (EMBB), Massive Machine Type Communications (MTC), and Ultra-Reliable and Low Latency Communication (URLLC) are defined as a top use-case. In order to satisfy service scenarios and new requirements, the 3GPP determines to define new radio (NR) different from conventional long term evolution (LTE) and defines both LTE and NR to 5G radio access technology.

An unlicensed band is a band in which various communication protocols coexist. Because various interference factors should be considered, listen before talk (LBT) is first performed, a channel state is determined and then communication can be performed.

In order to reduce communication errors between a wireless device and a base station, it is required to maintain downlink time-frequency synchronization. Even if LBT is performed in an unlicensed band, it is necessary to correctly maintain downlink time-frequency synchronization.

SUMMARY OF THE INVENTION

The present invention provides a method for transmitting a tracking reference signal (TRS) in an unlicensed band and a device using the method.

In an aspect, a method for transmitting a tracking reference signal (TRS) in an unlicensed band is provided. The method includes performing, by a base station, listen before talk (LBT) in the unlicensed band, and transmitting, by the base station, the TRS in a TRS resource set according to a result of the LBT. The TRS resource set includes a plurality of orthogonal frequency division multiplexing (OFDM) symbols capable of transmitting the TRS in a plurality of consecutive slots.

In another aspect, a device for transmitting a tracking reference signal (TRS) in an unlicensed band is provided. The device includes a transceiver configured to transmit and receive a radio signal, and a processor connected to the transceiver. The processor is configured to instruct the transceiver to perform listen before talk (LBT) in the unlicensed band, and instruct the transceiver to transmit the TRS in a TRS resource set according to a result of the LBT. The TRS resource set includes a plurality of orthogonal frequency division multiplexing (OFDM) symbols capable of transmitting the TRS in a plurality of consecutive slots.

Downlink time-frequency synchronization can be maintained correctly in an environment where various communication protocols coexist in an unlicensed band.

DESCRIPTION OF EXEMPLARY EMBODIMENTS

Technical features described hereinafter may be applied in a communication specification by the 3rd Generation Partnership Project (3GPP) standardization organization or a communication specification by the Institute of Electrical and Electronics Engineers (IEEE) standardization organization. For example, the communication specification by the 3GPP standardization organization includes a Long Term Evolution (LTE) and/or an evolution of the LTE system. The evolution of the LTE system includes LTE-A (Advanced), LTE-A Pro, and/or 5G New Radio (NR). The communication specification by the IEEE standardization organization includes a wireless local area network system such as IEEE 802.11a/b/g/b/ac/ax. The above-described system uses various multiple access technologies such as Orthogonal Frequency Division Multiple Access (OFDMA) and/or Single Carrier-Frequency Division Multiple Access (SC-FDMA) for an uplink and/or a downlink. For example, only OFDMA may be used for a downlink, only SC-FDMA may be used for an uplink, and OFDMA and SC-FDMA may be used with mixed for a downlink and/or an uplink.

A wireless device may be fixed or mobile, and may be referred to as other terms such as a user equipment (UE), a mobile station (MS), a mobile terminal (MT), a user terminal (UT), a subscriber station (SS), a personal digital assistant (PDA), a wireless modem, a handheld device, etc. The wireless device may also be a device that supports only data communication such as a Machine-Type Communication (MTC) device.

A base station (BS) generally refers to as a fixed station that communicates with the wireless device and may be referred to as other terms such as an evolved-NodeB (eNB), a gNB, a base transceiver system (BTS), an access point, etc. A Transmission Reception Point (TRP) includes an antenna array having one or more antenna elements. The BS may include one or more TRPs.

New radio (NR), which is 5G radio access technology supports various bandwidths and frequency bands for more flexible scheduling. NR also supports frequency bands of 6 GHz or above as well as frequency bands of 6 GHz or below. Supported bandwidths are maximum 100 MHz at frequencies of 6 GHz or below and maximum 400 MHz at frequencies of 6 GHz or above. Further, unlike 3GPP LTE fixed to subcarrier spacing of 15 kHz, NR may support various subcarrier spacing of 15 kHz, 30 kHz, 60 kHz, 120 kHz, and 240 kHz.

An NR specification supports various numerologies. A structure of a radio frame is changed according to numerology. Table 1 represents an example of supported numerology.

TABLE 1

| Numerology index ($\mu$) | Subcarrier spacing (kHz) | Cyclic prefix | Number of OFDM symbols per slot | Number of slots per radio frame | Number of slots per subframe |
| --- | --- | --- | --- | --- | --- |
| 0 | 15 | Normal | 14 | 10 | 1 |
| 1 | 30 | Normal | 14 | 20 | 2 |
| 2 | 60 | Normal | 14 | 40 | 4 |
| 2 | 60 | Extended | 12 | 40 | 4 |
| 3 | 120 | Normal | 14 | 80 | 8 |
| 4 | 250 | Normal | 14 | 160 | 16 |

Figure 1:
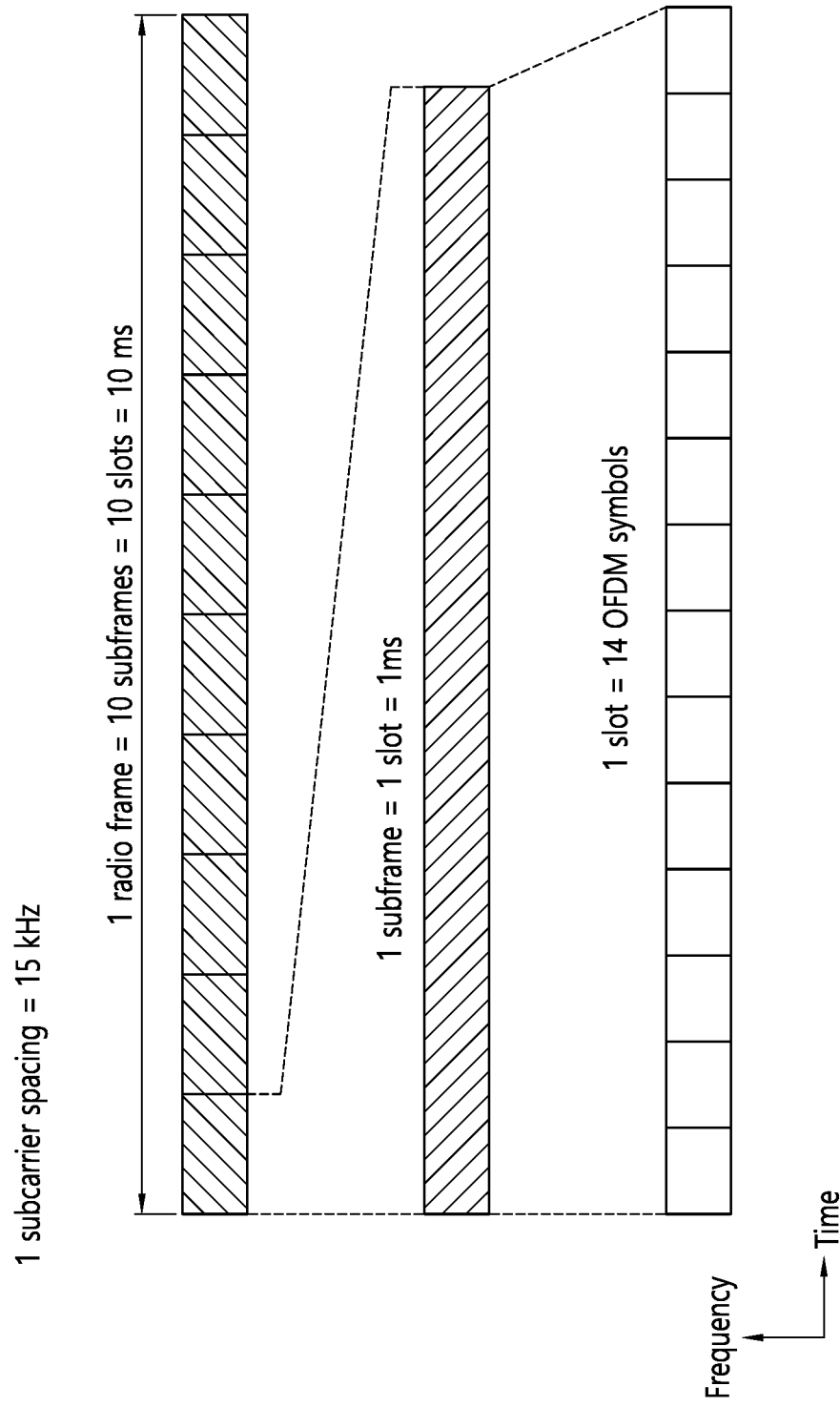
FIG. 1 illustrates an example of a radio frame structure to which the present invention is applied.

FIG. 1 illustrates an example of a radio frame structure to which the present invention is applied. This illustrates an example with a numerology index $\mu$=0 of Table 1.

A slot may include a plurality of orthogonal frequency division multiplexing (OFDM) symbols. The number of OFDM symbols in slots of Table 1 is only an example. The OFDM symbol is only for representing one symbol period in a time domain and does not limit a multiple access scheme or a term. For example, the OFDM symbol may be referred to as another term such as a single carrier-frequency division multiple access (SC-FDMA) symbol, a symbol period, etc.

OFDM symbols in the slot may be classified into a downlink (DL), flexible, and an uplink (UL). The classification is referred to as a slot format. A base station may notify a wireless device of information about the slot format. The wireless device may receive information on the slot format through an upper layer signal and/or downlink control information (DCI) on a Physical Downlink Control Channel (PDCCH). The wireless device assumes that DL transmission occurs in a DL OFDM symbol or a flexible OFDM symbol. The wireless device performs UL transmission in a UL OFDM symbol or a flexible OFDM symbol.

A resource block (RB) includes a plurality of continuous subcarriers in a frequency domain. For example, the RB may include 12 subcarriers. The common RB (CRB) is an RB in which an index is determined according to numerology. A Physical RB (PRB) is an RB defined in a bandwidth part (BWP). It is assumed that a total bandwidth of a particular numerology is 20 RB. The CRB is indexed from 0 to 19. When the BWP includes four CRBs (CRB 4 to CRB 7) among the 20 RBs, the PRB in the BWP are indexed from 0 to 3.

The BWP may be defined through a starting offset and a size from a CRB 0 on a given carrier. A specific number (e.g., maximum four) of BWP may be configured to the wireless device. At a particular time point, only a particular number (e.g., one) of BWPs per cell may be activated. The number of configurable BWPs or the number of activated BWPs may be set in common to an UL and a DL or individually set. The wireless device may expect DL transmission only in the activated DL BWP. The wireless device may perform UL transmission only in the activated UL BWP.

The wireless device may perform cell search to obtain time and/or frequency synchronization with the cell and to obtain a cell ID. For cell search, synchronization channels such as a Primary Synchronization Signal (PSS), a Secondary Synchronization Signal (SSS), and a Physical Broadcast CHannel (PBCH) may be used.

Figure 2:
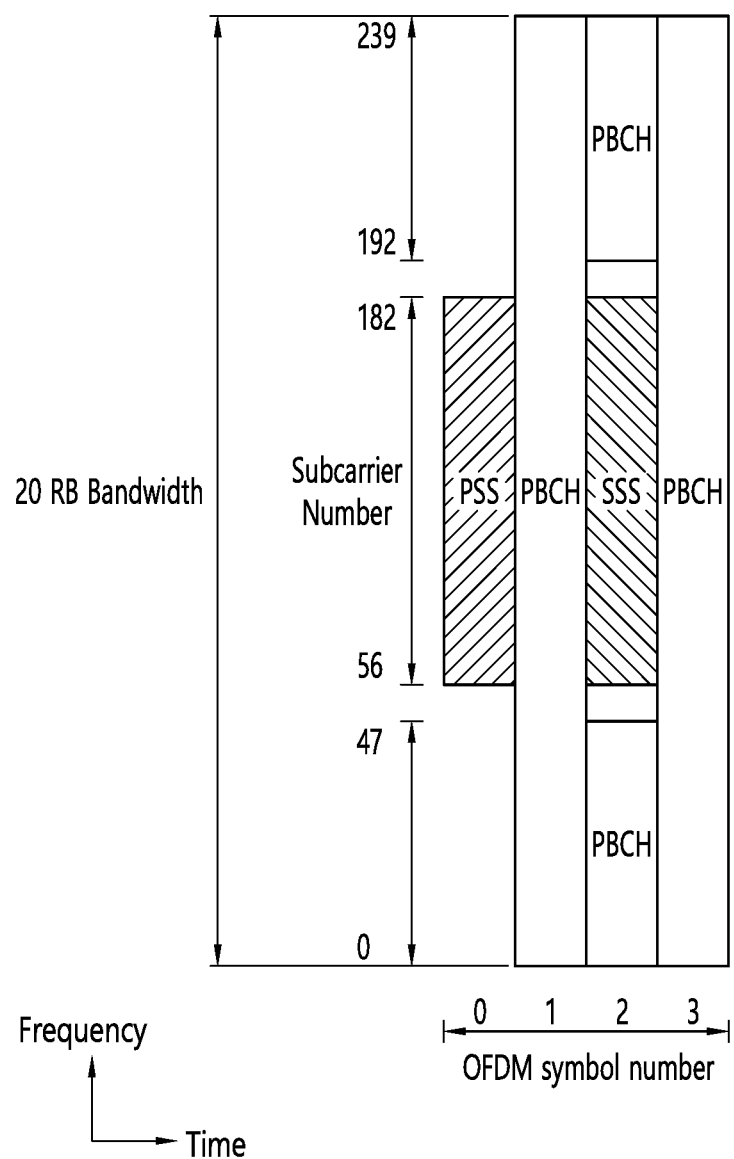
FIG. 2 illustrates an example of a synchronization channel applied to an example of the present specification.

FIG. 2 illustrates an example of a synchronization channel applied to an example of the present specification. The PSS and the SSS each may be transmitted through 127 subcarriers in one OFDM symbol. The PBCH may be transmitted through 240 subcarriers in 3 OFDM symbols.

A Synchronization Signal/PBCH (SSB) block includes a time/frequency resource in which the PSS, the SSS and the PBCH are to be transmitted. The PSS is used for obtaining symbol timing of the SSB block, and indicates three hypotheses for cell ID identification. The SSS is used for identifying a cell ID and indicates 336 hypotheses. As a result, 1008 physical layer cell IDs may be identified based on the PSS and the SSS.

The SSB block may be repeatedly transmitted according to a predetermined pattern within an SSB window. The SSB window may have a length of 5 ms. For example, when L SSB blocks are transmitted during one SSB window, all of L SSB blocks carries the same information but may be transmitted through beams with different directions. Quasi co-location (QCB) may not be applied to SSB blocks within one SSB window. A beam used for receiving the SSB block may also be used in subsequent operations (e.g., random access operations) between the wireless device and the network. The SSB window may be repeated at a specific period (e.g., 20 ms). The repetition period may be determined individually according to numerology.

The PBCH has a bandwidth of 20 RBs in second and fourth OFDM symbols, and a bandwidth of 8 RBs in a third OFDM symbol. A demodulation reference signal (DMRS) for decoding the PBCH is included in the PBCH. A frequency resource of the DMRS is determined based on a cell ID. The DMRS for the PBCH may include information indicating an index of an SSB block.

The PBCH may carry a Master Information Block (MIB). System information (SI) may be classified into Minimum SI (MSI) and Other SI (OSI). The MSI may be further classified into MIB and System Information Type1 (SIB1). The remaining MSI except for the MIB may be referred to as Remaining Minimum SI (RMSI).

The MIB includes information necessary for decoding the SIB1. For example, the MIB may include at least one of a message for SIB1 and a random access procedure, a subcarrier spacing applied to other system information, a frequency offset between an SSB block and an RB transmitted after the SSB block, a bandwidth of the PDCCH/SIB, and information for encoding the PDCCH. The MIB may be periodically transmitted, and the same MIB may be repeatedly transmitted during a specific time interval. The SIB1 is repeatedly transmitted through the PDSCH and includes control information for initial access of the UE and information for decoding another SIB.

The DL channel includes a Physical Downlink Control Channel (PDCCH), a Physical Downlink Shared Channel (PDSCH) and a Physical Broadcast Channel (PBCH). The UL channel includes a Physical Uplink Control Channel (PUCCH), a Physical Uplink Shared Channel (PUSCH) and a Physical Random Access Channel (PRACH).

The PDSCH carries DL data. The PBCH carries a Master Information Block (MIB) necessary for initial access. The PUSCH carries UL data.

The PDCCH carries DCI. The DCI includes a UL grant having resource allocation that schedules PUSCH transmission or a DL grant having resource allocation that schedules PDSCH transmission. A control resource set (CORESET) is defined as a resource for monitoring the PDCCH. A unique identifier is masked to cyclic redundancy check (CRC) of the DCI so that the wireless device may identify an owner or content of DCI in the PDCCH. The identifier is referred to as a Radio Network Temporary Identifier (RNTI). When the DCI includes UL grant or DL grant for a particular wireless device, Cell-RNTI (C-RNTI) is used. When the DCI carries system information, system information-RNTI (SI-RNTI) is used.

The PUCCH carries uplink control information (UCI). The UCI may include hybrid automatic repeat request (HARQ) ACK/NACK and/or channel state information (CSI). The PUCCH may be transmitted in one or more OFDM symbols according to a PUCCH format.

The following embodiments may be operated in a licensed band or an unlicensed band. The licensed band is a band that guarantees exclusive use of a particular communication protocol or a particular service provider. The unlicensed band is a band in which various communication protocols coexist and that guarantees shared use. For example, the unlicensed band may include 2.4 GHz band and/or 5 GHz band used by a wireless local area network (WLAN). In the unlicensed band, it is assumed that a channel is occupied through contention between respective communication nodes. Therefore, in communication in the unlicensed band, it is required to confirm that signal transmission is not achieved by other communication nodes by performing channel sensing. This is referred to as listen before talk (LBT) or clear channel assessment (CCA) for convenience. When it is determined that the other communication node does not transmit any signal in a particular channel, it is referred to that 'a channel is idle', 'CCA was confirmed', 'or LBT was confirmed'. Wen it is said that 'Perform LBT', 'Perform CCA', or 'Perform carrier sense (CS)', it implies that whether a channel is idle or is used by another node is confirmed first and thereafter the channel is accessed. A cell operating in the unlicensed band is referred to as an unlicensed cell or Licensed-Assisted Access (LAA) cell. A cell operating in the licensed band is referred to as a licensed cell.

Each serving cell may correspond to a BWP or a carrier. The serving cell may be classified into a primary cell and a secondary cell. The primary cell is a cell in which a wireless device performs initial connection establishment or connection re-establishment. The secondary cell is activated or deactivated by an instruction of the primary cell. When a plurality of serving cells are configured to a wireless device, the primary cell may be a licensed cell and the secondary cell may be an unlicensed cell. Alternatively, the primary cell may be an unlicensed cell and the secondary cell may be a licensed cell. A plurality of licensed cells or a plurality of unlicensed cells may be configured.

In 3GPP LTE, a cell specific reference signal (CRS) is used for maintaining DL time-frequency synchronization as well as for measuring channel quality. This is because the CRS is a reference signal (RS) transmitted according to a predetermined pattern every subframe. However, because the CRS occupies too many resources, the NR system does not define an RS that guarantees periodic transmission such as a CRS. A tracking reference signal (TRS) is defined to track DL time-frequency synchronization.

Figure 3:
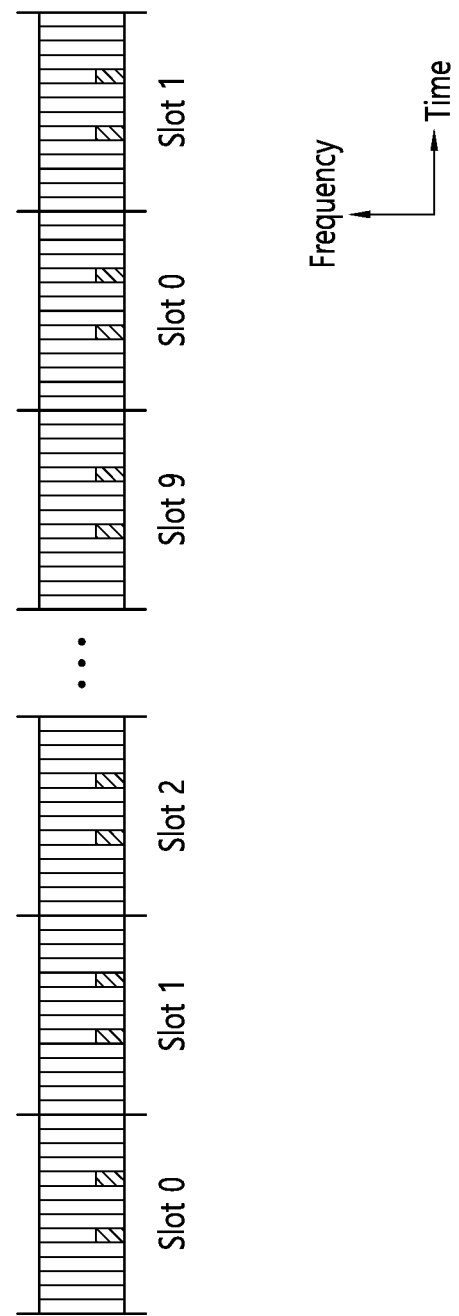
FIG. 3 illustrates an example of a TRS to which an embodiment of the present invention is applied.

FIG. 3 illustrates an example of a TRS to which an embodiment of the present invention is applied.

One slot includes 14 OFDM symbols, but this is only an example. An index of the OFDM symbol in the slot is 1, and $0 \leq l \leq 13$. It is assumed that one radio frame includes 10 slots and the slots are indexed from 0 to 9.

The TRS is transmitted in two consecutive slots and is transmitted in two OFDM symbols in each slot. For example, a TRS may be transmitted in OFDM symbols with $l \in \{4,8\}$, $l \in \{5,9\}$, or $l \in \{6,10\}$ in each slot. A bandwidth (or the number of subcarriers) in which a TRS is transmitted in each OFDM symbol may be defined separately.

An RS sequence r(m) for a TRS may be defined as follows.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

where c(n) is a gold sequence defined to Equation 2.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 2]}$$

where $N_C = 1600$, and $x_2(n)$ is initialized based on $c_{init}$ of Equation 3.

$$c_{init} = (2^{10} \cdot (14n_{s,f} + l + 1)(2n_{ID} - 1) + n_{ID}) \bmod 2^{31} \quad \text{[Equation 3]}$$

where $n_{s,f}$ is a slot index in a radio frame, l is an index of an OFDM symbol in the slot, and nip is a given parameter.

TRS configuration information may include at least one of whether a TRS is transmitted, a transmission period of the TRS, slot offset, an index of two OFDM symbols in the slot, and a bandwidth in which the TRS is transmitted. The TRS configuration information may be provided to the wireless device by the base station. A set of OFDM symbols in which a TRS is transmitted in a plurality of consecutive slots is referred to as a TRS resource set.

An example of FIG. 3 shows that a TRS is transmitted with a 10 slot period in 4 OFDM symbols with $l \in \{5,9\}$ of a slot 0 and a slot 1.

In the unlicensed band, the base station may first perform an LBT operation and perform DL transmission after LBT is successful (i.e., the channel is idle). Therefore, all predetermined TRS resource sets may not be available according to a time point in which LBT is successful by the base station. In order to achieve a purpose of TRS transmission for DL time-frequency synchronization, it is preferable that the TRS is transmitted in at least two OFDM symbols. When the TRS is transmitted in only one OFDM symbol in the TRS resource set, the TRS may not be useful for maintaining DL time-frequency synchronization.

Figure 4:
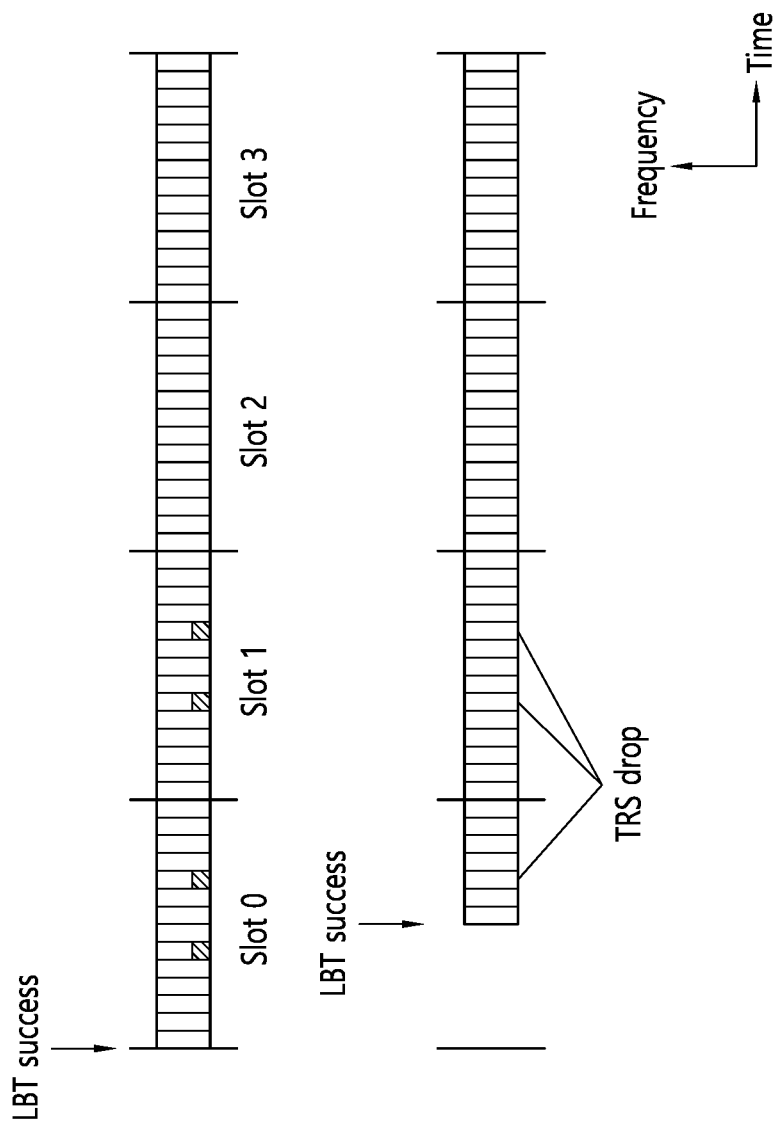
FIG. 4 illustrates a TRS transmission method according to an embodiment of the present invention.

FIG. 4 illustrates a TRS transmission method according to an embodiment of the present invention.

When LBT is successful before the TRS resource set, the base station transmits a TRS in the TRS resource set. Because the LBT is delayed, at least one OFDM symbol in the TRS resource set is not used for TRS transmission, the base station does not transmit a TRS in the TRS resource set. When the LBT is successful after a first OFDM symbol in the TRS resource set, the base station does not transmit a TRS in the TRS resource set.

According to an example of FIG. 4, the TRS resource set includes four OFDM symbols with $l \in [5,9]$ of a slot 0 and a slot 1. When the LBT is successful before the TRS resource set, the TRS is transmitted in the TRS resource set. When the LBT is successful in a first OFDM symbol in the TRS resource set, the TRS is not transmitted in the TRS resource set.

When a TRS resource set includes a plurality of consecutive slots, a TRS may be transmitted in an OFDM symbol in a slot after the LBT is successful among a plurality of consecutive slots. In an example of FIG. 4, when the LBT is successful in a 7th OFDM symbol of a slot 0, the transmission of the TRS may begin from 2 OFDM symbols of a slot 1.

Even if the base station does not transmit a TRS in all or some of the TS resource set, the wireless device may assume that the TRS is always transmitted in the TRS resource set. The TRS may assume that no other signal is transmitted in the TRS resource set.

Alternatively, when the wireless device determines that the TRS is not transmitted in the TRS resource set, it may be assumed that another signal is transmitted to the corresponding TRS resource set.

Figure 5:
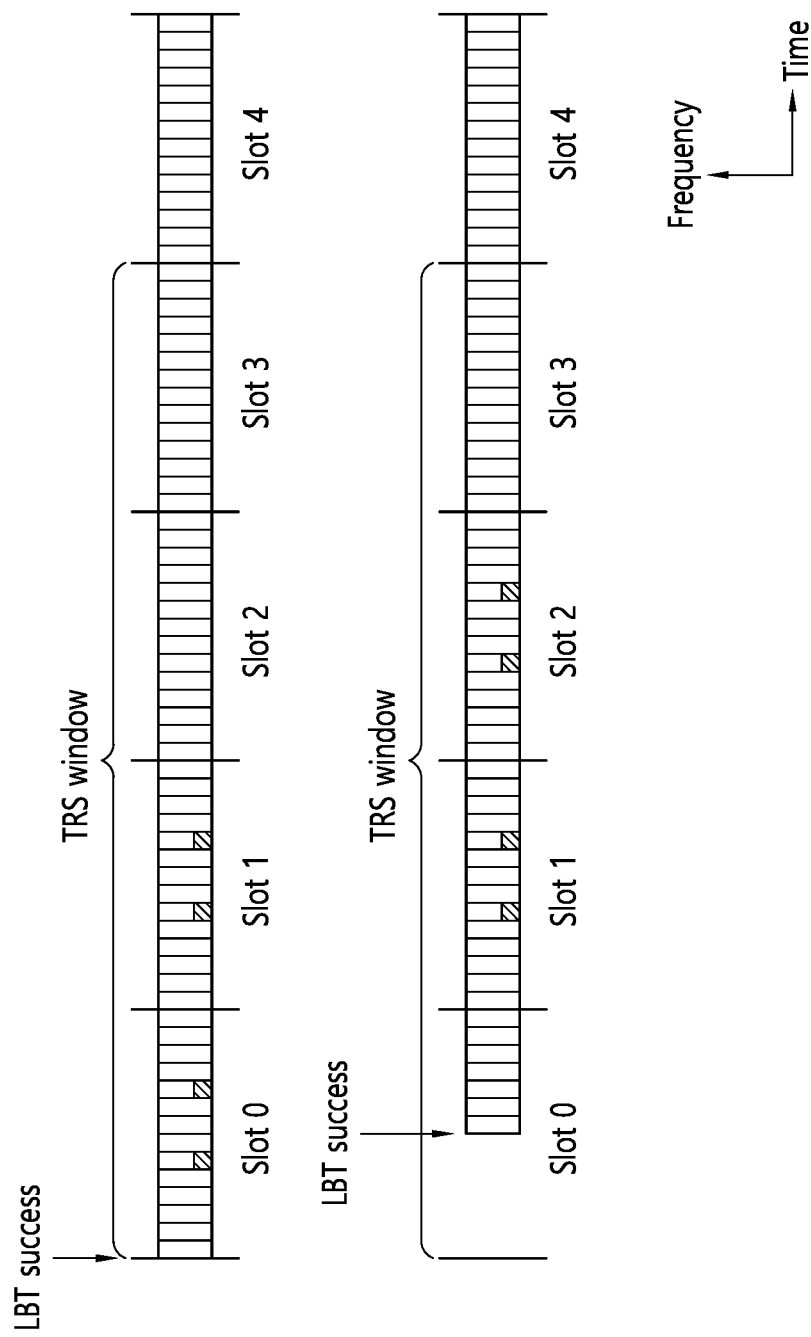
FIG. 5 illustrates a TRS transmission method according to another embodiment of the present invention.

FIG. 5 illustrates a TRS transmission method according to another embodiment of the present invention.

A slot is not fixed in which the TRS resource set is started, but the TRS resource set may be started in any slot within a TRS window. The TRS window includes four slots, but this is only an example. The TRS resource set may be started from a slot in which the LBT is successful within the TRS window. When it is assumed that the TRS resource set includes two consecutive slots, if LBT is successful in a slot 1, the TRS resource set may include a slot 1 and a slot 2.

In order to prevent no use of a part of the TRS resource set according to a result of the LBT, the entire TRS resource set may be used for TRS transmission by changing a start time of the TRS resource set in the TRS window.

The wireless device may assume that TRS transmissions may be initiated in all slots in the TRS window. The wireless device may assume that no other signal is transmitted to a resource that may transmit the TRS in the TRS window.

The wireless device may determine a TRS transmission set used for actual TRS transmission in the TRS window and assume that another signal is transmitted in the remaining slots.

Figure 6:
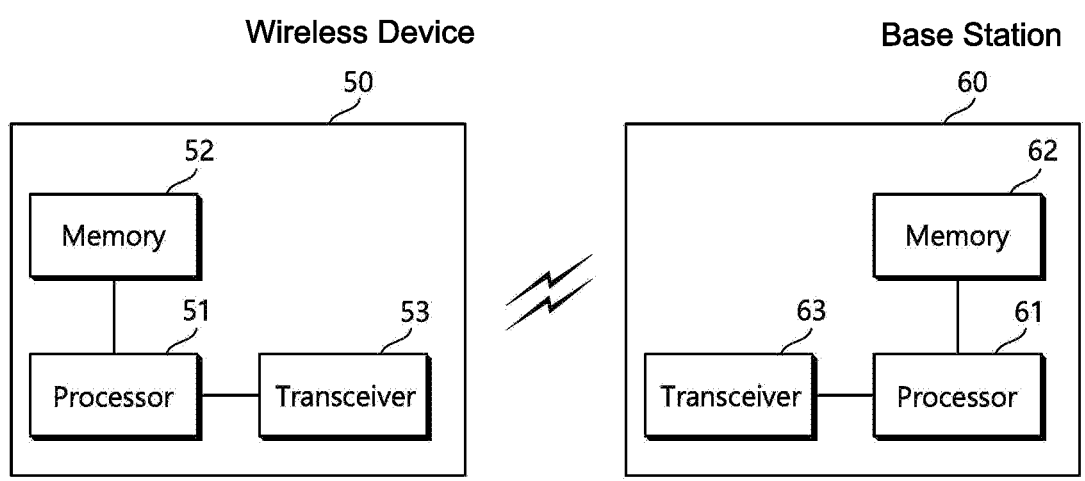
FIG. 6 is a block diagram illustrating a wireless communication system in which an embodiment of the present invention is implemented.

FIG. 6 is a block diagram illustrating a wireless communication system in which an embodiment of the present invention is implemented.

A wireless device 50 includes a processor 51, a memory 52, and a transceiver 53. The memory 52 is connected to the processor 51 and stores various instructions executed by the processor 51. The transceiver 53 is connected to the processor 51 to transmit and/or receive a radio signal. The processor 51 implements proposed functions, processes, and/or methods. In the above-described embodiment, an operation of the wireless device may be implemented by the processor 51. When the above-described embodiments are implemented in software instructions, the instructions are stored in the memory 52 and are executed by the processor 51 and thus the above-described operations may be performed.

A base station 60 includes a processor 61, a memory 62, and a transceiver 63. The base station 60 may be operated in an unlicensed band. The memory 62 is connected to the processor 61 and stores various instructions executed by the processor 61. The transceiver 63 is connected to the processor 61 to transmit and/or receive a radio signal. The processor 61 implements proposed functions, procedures, and/or methods. In the above-described embodiment, an operation of the base station may be implemented by the processor 61. When the above-described embodiments are implemented in software instructions, the instructions are stored in the memory 62 and are executed by the processor 61 and thus the above-described operations may be performed.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a tracking reference signal (TRS) in an unlicensed band, the method performed by a base station and comprising:

transmitting a TRS configuration to a user equipment, the TRS configuration including a transmission period of a TRS and a TRS window, the TRS window including a plurality of consecutive slots, each slot including 14 orthogonal frequency division multiplexing (OFDM) symbols which are indexed from 0 to 13;

determining a first slot within the TRS window at every transmission period by performing listen before talk (LBT) in the unlicensed band, wherein the first slot is a slot at which the LBT is first successful among the plurality of consecutive slots in the TRS window; and based on the first slot not being a last slot of the TRS windows, transmitting the TRS to the user equipment in the first slot and a second slot which is next to the first slot, wherein the TRS is transmitted over two OFDM symbols in each of the first slot and the second slot, the two OFDM symbols having one of indexes {4,8}, {5,9} and {6,10}.

2. A device for transmitting a tracking reference signal (TRS) in an unlicensed band, the device comprising:

a transceiver configured to transmit and receive a radio signal; and a processor operatively connected to the transceiver, and configured to:

instruct the transceiver to transmit a TRS configuration to a user equipment, the TRS configuration including a transmission period of a TRS and a TRS window, the TRS window including a plurality of consecutive slots, each slot including 14 orthogonal frequency division multiplexing (OFDM) symbols which are indexed from 0 to 13;

instruct the transceiver to determine a first slot within the TRS window at every transmission period by performing listen before talk (LBT) in the unlicensed band, wherein the first slot is a slot at which the LBT is first successful among the plurality of consecutive slots in the TRS window; and instruct the transceiver to transmit the TRS to the user equipment in the first slot and a second slot which is next to the first slot based on the first slot not being a last slot of the TRS windows, wherein the TRS is transmitted over two OFDM symbols in each of the first slot and the second slot, the two OFDM symbols having one of indexes {4,8}, {5,9} and {6,10}.

3. The method of claim 1, wherein the TRS is not transmitted based on the first slot being a last slot of the TRS window.

4. The method of claim 1, wherein the TRS includes four sequences corresponding to four OFDM symbols over the first slot and the second slot, each sequence being generated based on an index of a corresponding slot and an index of a corresponding OFDM symbol within a corresponding slot.

5. The method of claim 1, wherein the TRS configuration further includes information as to whether a TRS transmission is present.

6. The device of claim 2, wherein the TRS is not transmitted based on the first slot being a last slot of the TRS window.

7. The device of claim 2, wherein the TRS includes four sequences corresponding to four OFDM symbols over the first slot and the second slot, each sequence being generated based on an index of a corresponding slot and an index of a corresponding OFDM symbol within a corresponding slot.

8. The device of claim 2, wherein the TRS configuration further includes information as to whether a TRS transmission is present.

* * * * *